Oct. 25, 1960   R. M. CHALLENDER ET AL   2,958,026
PROGRAMMED SPEED AND GAIN CONTROL SYSTEM
Filed Oct. 1, 1959   2 Sheets-Sheet 1

INVENTORS:
ROBERT M. CHALLENDER
and OLIN L. DUPY
BY:
Bean, Brooks, Buckley & Bean
ATTORNEYS.

INVENTORS:
ROBERT M. CHALLENDER
and OLIN L. DUPY
BY:
Bean, Brooks, Buckley & Bean
ATTORNEYS.

United States Patent Office 2,958,026
Patented Oct. 25, 1960

2,958,026

PROGRAMMED SPEED AND GAIN CONTROL SYSTEM

Robert M. Challender, Orchard Park, N.Y., and Olin L. Dupy, West Los Angeles, Calif., assignors to Wiesner-Rapp Co., Inc., Buffalo, N.Y.

Filed Oct. 1, 1959, Ser. No. 843,738

18 Claims. (Cl. 318—162)

This invention relates to speed control systems, and more particularly relates to a system wherein the speed of a drive motor is controlled throughout the performing of a series of mechanical operations according to a program recorded on a signal carrying medium that is simultaneously driven by the motor as it performs said operations.

It is a principal object of this invention to provide an electronic system which continuously receives signal pulses from a recorded program-carrying medium advanced by the drive motor, averages pulses locked to the frequency of the signal pulses, and compares the average level thereof with an adjustable reference potential, and constantly corrects the speed of the drive motor to maintain a null condition between the average level of recorded signals and the reference potential with which they are compared, whereby the density of the recorded signals on the recorded program medium will determine at each instant of time the rate at which the drive motor must rotate to maintain said null condition. Thus, the density distribution of the signals on the recorded programmes the instantaneous rates of rotation of the drive motor and therefore the rate of performance of said mechanical operations.

It is a further object of the invention to provide novel and efficient circuitry for adjusting the direction and rate of rotation of the auxiliary reversible motor depending upon the direction and degree of deviation of the recorded signals from a null condition.

It is another principal object of the invention to provide in a programmed speed control system, wherein transducer and amplifier means are provided to pick up recorded signals from the recorded medium, an automatic gain control associated with said amplifier means and adjusting the gain inversely as the speed of advance of the medium so that the amplitude of the signals delivered by the amplifier means will be compensated for changes in the rate of advance of the signal carrying medium past the transducer, thereby maintaining a favorable signal-to-noise ratio at the various rates of advance of the recorded medium.

It is another object of the invention to provide a gain control for the transducer signal amplifier and to connect the gain control for actuation by the auxiliary reversible motor whereby the gain control and the feed motor speed control are simultaneously and inversely adjusted.

Another major object of the invention is to provide a machine control system capable of obtaining optimum machine performance under various machine operating conditions so that for quick changes and shallow cuts the mechanical drive rate can be accelerated, and for heavier cuts the drive rate can be retarded.

A further object is to provide a system wherein the speed of the machine drive will be automatically controlled to prevent operation of the machine at harmful or dangerous rates, but wherein the operator may in case of an emergency override the automatic control. Furthermore, in the event of failure of the control signals, or in case of breakage of the magnetic recording medium, the system will automatically slow the machine to a minimum speed. In addition, the system has the advantage that the calibration thereof can be easily changed so as to operate the drive motor at various percentages of the recorded control-pulse rate, this change in calibration being accomplished by merely changing the steady level of the reference potential and thereby shifting the point at which the reference potential and the average value of the control signals will null.

Still another object of the invention is to provide an auxiliary reversible motor which is actuated by the system to rotate in one direction or the other, depending on the direction in which the average value of the control signals is out of null with the reference potential, and said reversible motor adjusting a drive motor speeed control, such as a potentiometer.

Other objects and advantages of the invention will become apparent during the following discussion of the drawings wherein.

Figure 1:
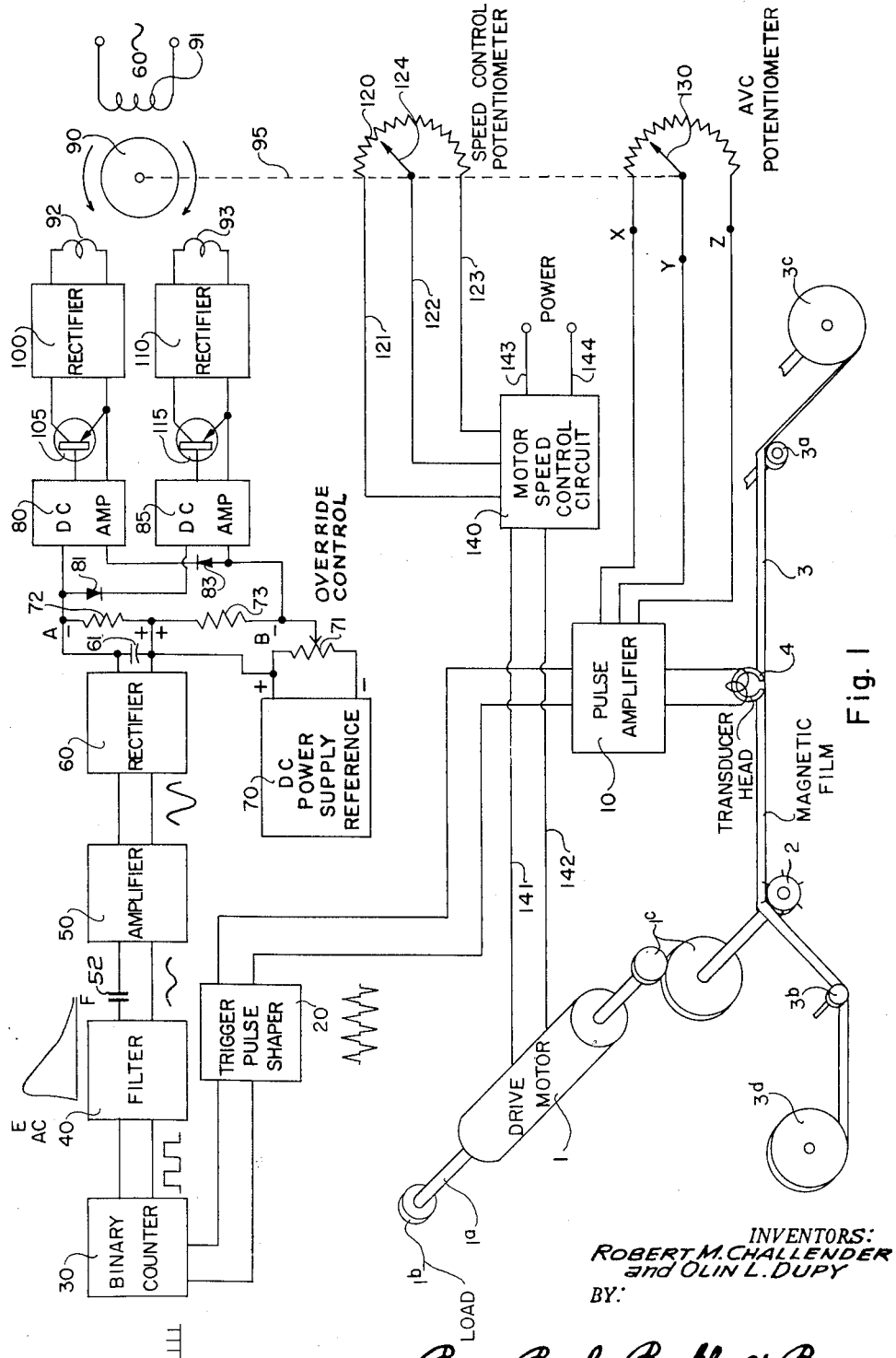
Fig. 1 is a block diagram showing the system including the drive motor, the magnetic record medium, the transducer associated with the record medium, and the automatic speed control system whereby the speed of the drive motor is automatically controlled by the density of the signals recorded on the magnetic medium.

Referring now to the drawings, Fig. 1 illustrates a machine drive motor 1 having a shaft 1a at one end of which is a gear 1b to which a load may be attached, such a load comprising, for instance, the feed of a machine tool. At the other end of the shaft 1a is a speed reducer 1c which in turn rotates a sprocket 2 at a rate which is exactly synchronized with the rotation rate of the load gear 1b. A magnetic record medium 3 passes over the sprocket and preferably comprises a magnetic film having two rows of perforations along opposite sides of the film so as to maintain the film exactly in step with the sprocket 2. The film 3 also passes over idlers 3a and 3b as it travels from the storage spool 3c to the take-up spool 3d. The mechanical advance mechanism of the recorded film 3 is only schematically illustrated in the drawings. A magnetic transducer head 4 is disposed adjacent the magnetic film 3 and receives control signals from the film which comprise individual pulses recorded thereon at varying densities, and these pulses are in turn delivered to a pulse amplifier 10. In this amplifier the control signal pulses are amplified and are then passed to a pulse shaping circuit 20 which comprises a monostable multivibrator which is triggered by the pulses from the amplifier 10 and which delivers pulses of uniform amplitude and energy content to a binary counter circuit 30. This binary counter comprises a bistable multivibrator which is reversed each time a pulse is received at the magnetic transducer head 4. Thus, a square wave output is derived from the binary counter 30 and has a frequency equal to one-half the frequency of the pulses picked up by the transducer 4. This square wave is then passed through a low-pass filter 40 which delivers an output wave the amplitude of which is inversely proportional to the frequency of the square wave fed in, the output being then delivered to an amplifier 50. The amplified wave is then full-wave rectified in the rectifier 60, and the output thereof is smoothed by a condenser 61 across the output of the rectifier 60. A D.C. power supply 70 comprises the reference potential source, and delivers a constant voltage across a potentiometer 71. This potentiometer 71 forms part of a bridge circuit including resistances 72 and 73. The resistance 72 is connected across the filter condenser 61 so that the rectified sine wave voltage coming from the rectifier 60 charges the condenser 61 and maintains a voltage across the resistance 72 having the polarity shown in Fig. 1. The D.C. reference voltage from the power supply 70 has its level controlled by the potentiometer 71 and is applied across the resistance 73 with its polarity opposite to the polarity of the voltage appearing across the resistance 72. The resistances 72 and 73 are thus connected in series opposition so that if the voltage appearing across resistance 72 is equal to the voltage appearing across resistance 73 a null condition will result whereby these two voltages exactly cancel out when the resultant of the two is measured between points A and B, or in other words, between the extremities of the two series-connected resistances.

Two D.C. amplifiers 80 and 85 are respectively connected across the points A and B by means of diodes 81 and 83, respectively. These diodes are so oriented that whenever the voltage at A is negative with respect to the voltage at B, only the amplifier 85 will conduct, however when the voltage at point B is negative with respect to the point A, only the amplifier 80 will conduct. Also, when the voltage between A and B is zero, neither the amplifier 80 nor the amplifier 85 will conduct.

The condition of conductivity of the amplifiers 80 and 85 is employed to control the rotation and the direction of rotation of the auxiliary reversible motor 90. This motor is a shaded pole induction motor having an exciting winding 91 and having pole-shading windings 92 and 93 such that if either of the windings 92 or 93 is substantially short-circuited, the motor 90 will be started in the direction corresponding with the particular pole-shading winding which is short-circuited. Full-wave rectifiers 100 and 110 are employed to couple the pole-shading windings 92 and 93 to transistors 105 and 115, which transistors are normally nonconductive. That is to say, whenever the amplifier 80 is conductive, the transistor 105 is forwardly biased and thereby tends to short-circuit the shading winding 92 through the rectifier 100. Similarly, when the other D.C. amplifier 85 is rendered conductive, the transistor 115 becomes effective and the shading winding 93 is substantially short-circuited through the rectifier 110.

Thus, the motor 90 will start rotating in one direction when the D.C. amplifier 80 is conductive; and the motor will start to rotate in the opposite direction when the D.C. amplifier 85 is rendered conductive.

The motor 90 has a shaft 95, schematically illustrated by the dashed line in Fig. 1, which connects to a speed control rheostat 130. The rheostat 120 is connected by three wires 121, 122 and 123 with a motor speed control circuit 140 which is of any conventional type that can be controlled by a rheostat, as shown in the present embodiment. However, it is to be understood that the present invention is not limited only to rheostat-controlled motor speed control circuits. The motor speed control is then connected by wires 141 and 142 directly to the drive motor so that rotation of the wiper arm 124 by the motor shaft 95 causes variations in the speed of the drive motor 1. Two wires 143 and 144 are shown in Fig. 1, which wires connect with a suitable source of power such as the 60-cycle mains.

The automatic volume control rheostat 130 is connected by way of terminals X, Y and Z with the pulse amplifier 10 and serves the purpose of changing the gain of the amplifier in inverse proportion to the speed of the motor 1. In other words, the slower the motor 1 runs the higher the gain of the amplifier 10, and vice versa.

This automatic volume control feature is not required in all speed control systems according to this invention, but only where the range of controllable speeds is very great and therefore the rate of advance of the magnetic film is varied over wide limits. Where more than one track is recorded on the magnetic film, a separate amplifier 10 will be associated with each track and the same rheostat 130 will control all of the gains of all of the amplifiers 10 in unison.

Figure 2:
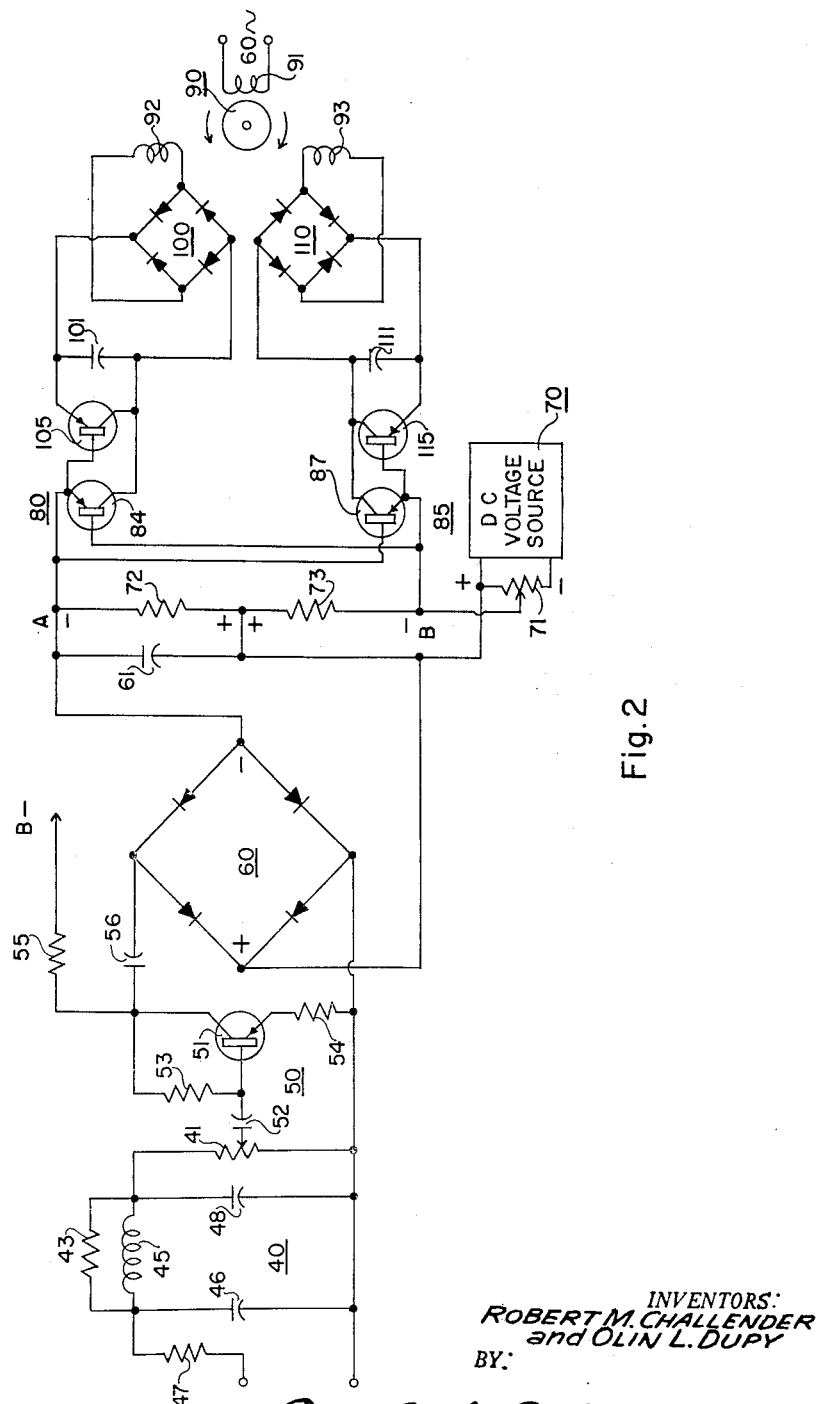
Fig. 2 is a more detailed schematic diagram showing the circuitry whereby the average level of the recorded signals is compared with the reference potential, and whereby the direction of rotation of the auxiliary reversible motor is controlled.

Fig. 2 shows a somewhat more detailed circuit in which the low-pass filter comprises an LC pi network having an input resistance 47 and an output resistance 41. The output resistance 41 comprises a potentiometer so that the amplitude of the output sine wave from the filter 40 can be controlled and coupled to the base of the amplifier 51 by way of a condenser 52, a resistance 53 furnishing the forward bias for the transistor. The output circuit of the transistor 51 includes a stabilizing resistance 54 in the emitter and a load resistance 55 in the collector, and the output of this transistor is fed by way of a coupling condenser 56 into the full-wave rectifier 60, comprising four diodes in conventional connection. The D.C. amplifiers 80 and 85 also comprise transistors 84 and 87. The transistor 84 in its emitter-collector circuit serves as a variable resistance to supply bias from the collector of the transistor 105 to its base so as to forwardly bias this transistor whenever the transistor 84 is rendered conductive by the application of negative bias to its base.

Alternatively, when the transistor 84 is nonconductive, the transistor 87 may be rendered conductive by supplying a forward bias from point A to its base so as to effectively connect the collector to the base of the transistor 115 and thereby render the latter transistor fully conductive. When the transistors 84 and 105 are conductive, the shading winding 92 is thereby short-circuited through the rectifier 100. Conversely, when the transistors 87 and 115 are forwardly biased, the shading winding 93 is effectively short-circuited through the rectifier 110 and causes the motor 92 to rotate in the opposite direction.

*Operation*

The above circuits described in connection with Figs. 1 and 2 provide suitable motor control as follows:

The record medium, a magnetic film in this embodiment, is geared to the motor 1 by way of the sprocket 2 and is driven at a linear film speed that is proportional to the rate of rotation of the motor. The control signals which are recorded on the film 3 take the form of magnetic pulses spaced therealong, and the transducer head 4 picks up these pulses and sends them to the amplifier 10. The number of pulses per unit time which are thus transmitted to the amplifier 10 is determined by the pulse density on the magnetic film and by the speed of the motor 1. The shape and amplitude of these pulses depends to a considerable extent upon the linear speed at which the film is advanced; but for optimum circuit performance the system requires a uniform wave shape for each pulse. It is therefore necessary to pass these pulses through shaping circuits, and these shaping circuits take the form of a monostable multivibrator 20 serving as a trigger and delivering output pulses having the wave form shown to the left of the block 30 in Fig. 1. These pulses are of a substantially constant width and amplitude which is independent of the width and amplitude of the input signal in the circuit employed. If desired, the input pulses from the amplifier 10 to the trigger circuit 20 can be narrowed by employing a conventional differentiating circuit (not shown).

These pulses are then fed to the binary counter 30 which comprises a bistable multivibrator the output of which is alternated from one condition of conductivity to the other by each of the trigger pulses received, and this binary counter produces a square wave output which is uniform in height and width, and the frequency of which is one-half the repetition rate of the input pulses. The square wave shown between the blocks 30 and 40 in Fig. 1 is then fed to a low-pass filter which, for all practical purposes, eliminates the harmonics contained in the square wave and produces a sine wave alternating at the same frequency as the input square wave. This sine wave is shown in Fig. 1 between the blocks 40 and 50. A composite curve of the coupling condenser 52 and this filter, with voltage output plotted against frequency, is shown above the block 40 in Fig. 1, and it will be seen that this filter attenuates the fundamental wave in proportion to its frequency. The filter is designed to attenuate 100 cycles to one-half the maximum input voltage. The resistor 43 across the inductance 45, Fig. 2, changes the slope of the filter curve to give the correct mid-frequency response and sufficient response at the upper and lower limits. The additional resistances 47 and 41 serve to provide proper impedance matching to and from the filter. The alternating current output from the filter is amplified in the amplifier 50, comprising the transistor 51, and the amplified output is rectified by the full-wave rectifier 60 which then applies a unidirectional potential across the resistor 62, this potential being smoothed by the capacitor 61. The voltage across resistance 72 is therefore dependent upon the speed of the motor 1, and upon the spacing of the pulses on the magnetic tape 3 that is being driven by the motor. The resistance 73 is connected in series with the resistance 72 and is energized from a D.C. voltage source 70 provided with a manual-control potentiometer 71. The signal voltage across the resistance 72 and the reference potential across the resistance 73 are connected in series opposition so that the resulting voltage across these resistances is the algebraic sum of the two individual voltages. The D.C. amplifiers 80 and 85 are connected to receive this difference in voltage, through their base-emitter circuits acting as diodes permitting only one of the two D.C. amplifier transistors 84 or 87 to be conductive at any one time, depending upon the polarity of the voltage as measured between points A and B. If the voltages across the two resistances 72 and 73 are equal, the difference between them is zero and the system is balanced at this zero voltage so that no action takes place. If the pulse rate into the system increases either by speeding up of the motor 1 or by increased pulse density on the magnetic film 2, the result is that the voltage across the resistance 72 decreases and the amplifier 85 is turned on thereby substantially short-circuiting the shading winding 93 and causing the motor 90 to operate in such a direction as to turn the potentiometer 120 and thereby cause the motor control circuit 140 to reduce the speed of the drive motor 1. Conversely, if the motor 1 should slow down or if the pulse density should decrease on the magnetic film 3 the repetition rate of the pulses picked up by the transducer head will be raised and when fed into the filter 40 will appear at this output at a higher frequency and therefore a higher voltage will be applied across the resistance 72. Thus, the voltage at 80 will become less negative and the amplifier 85 will cut off and the amplifier 80 will be rendered conductive so as to substantially short-circuit the shading winding 92 and cause the motor 90 to rotate the potentiometer 120 in such a direction as to raise the speed of the drive motor 1. As stated above, whenever the amplifier 80 or the amplifier 85 is rendered conductive, the associated transistor gate 105 or 115, respectively, is also rendered conductive and short-circuits the associated shading winding 92 or 93 through the associated full-wave rectifier 100 or 110.

In either case, however, the speed of the drive motor 1 is always maintained at the programmed speed as determined by the density of the pulses on the magnetic film 3. The general speed of the system can be manually set by adjustment of the potentiometer 71, and when this adjustment is changed a different voltage is then required across the output of the rectifier 60 and across the resistance 72 in order to balance or null the newly selected reference voltage across the resistance 73. Thus, moving the potentiometer 71 has the same off-null effect on the system as occurs when the motor speed of pulse density changes, and therefore the system will automatically rebalance itself.

A fail-safe feature is inherent in this system. Condenser 52, Fig. 2, has a large capacity and therefore low impedance so that it is able to pass very low frequencies with little attenuation until the frequency becomes nearly zero. Thus if for any reason the input fails entirely the wave through condenser 52 drops to zero which condition simulates the case in which the input to the filter 40 is at a very high frequency so that substantially no output comes from the filter 40. As described above, the output of the filter 40, and consequently the voltage applied across the resistance 72, approaches zero not only for lack of input to the filter but also when the input frequency is very high, see the graph above the filter 40 in Fig. 1. This lower voltage across the resistance 72 unbalances the system in the direction to slow down the drive motor. Consequently, if for any reason the system fails to receive a signal from the magnetic film 3, the voltage across the resistance 72 becomes zero which results in maximum unbalance in the decelerating direction whereby the motor 1 will be slowed down to its minimum rate of speed.

The automatic gain control feature of the present invention including the potentiometer 130 as shown in Fig. 1 is important in the system if the speed of the drive motor is to be varied over a very large range. If the range of speed changes were only of the order of 10 or even 20-to-1, such automatic volume control might not be necessary, but by employing the automatic gain control feature the speed of advance of the recorded film can be varied as much as 100-to-1. It is well known that as the speed changes when advancing a magnetic film, there is a very great change in overall amplitude of the signal. If the magnetic film is greatly slowed down, the amplitude of the signal is reduced to such a point that a great deal more gain is necessary in order to produce a workable signal at the output of the amplifier 10. On the other hand, if the gain of the amplifier were made high enough to accommodate the slowest rates of advance of the magnetic film, the noise level would be so great at the highest speed of the magnetic film that the system would not be able to distinguish the difference between recorded signals and background noise. Thus, an automatic volume control designed to provide the proper amount of gain for each of the various possible rates of advance of the magnetic film is highly desirable.

The gain control potentiometer 130 is therefore connected for rotation by the same shaft 95 which controls the potentiometer 120 which controls the rotation rate of the motor 1. Thus, the gain of the amplifier will automatically be adjusted to the proper level in substantially inverse proportion to the linear speed of the magnetic film 3.

In the event that a vacuum tube amplifier is used in the amplifier 10, a suitable variable-mu tube can be used in at least one of the amplifier stages, and the potentiometer 130 can be used to vary the bias thereon. In the case of a transistor amplifier, its gain can be controlled by varying the power supply voltage to one or more of the transistors preferably in one of the low-level stages near the input where the current requirements are small.

It is to be understood that more than one set of signals can be recorded on the magnetic film 3 so as to control more than one function of a machine. In this event, however, the same potentiometer 130 can still be used to automatically adjust the gain in at least one of the amplifier stages associated with each recorded track on the magnetic film.

The following components provide a satisfactory working embodiment in the circuits shown in Figs. 1 and 2:

| | |
|---|---|
| Resistance 43 | 4,700 ohms. |
| Resistance 47 | 1,500 ohms. |
| Resistance potentiometer 41 | 2,000 ohms. |
| Inductance 45 | 4.29 henrys. |
| Capacitors 46 and 48 | 1.25 microfarads. |
| Capacitor 52 | 100 microfarads. |
| Resistance 53 | 15,000 ohms. |
| Resistance 54 | 1 ohm. |
| Resistance 55 | 270 ohms. |
| Capacitor 56 | 50 microfarads. |
| Capacitor 61 | 50 microfarads. |
| Resistance 72 and 73 | 100 ohms. |
| Capacitors 101 and 111 | 50 microfarads. |
| Rectifiers 100 and 110 | Employ IN1447 diodes. |
| Transistors 105 and 115 | 2N174. |
| Reversible motor 90 | Merkle-Korff — SG wound reversing motor. |

The present invention is not to be limited to the exact embodiment shown in the drawings, for obviously changes may be made with in the scope of the claims.

What is claimed is:

1. A programmed speed control system for controlling the speed of a motor in response to control signals recorded on a signal carrying medium advanced by said motor, comprising transducer and wave form shaping means cooperating with said medium and delivering uniform pulses initiated by the respective recorded signals; converting means connected to said shaping means and changing said pulses into a D.C. potential fluctuating in value in inverse proportion to the rate at which said uniform pulses are received; a source of D.C. reference potential; bridge means connected to receive both potentials in polarity opposition and delivering a control voltage proportional to the difference therebetween and having a polarity dependent on which potential is greater; motor speed control means; and polarity sensitive means connected between said bridge means and said speed control means and actuating the latter to regulate the motor speed and constantly correct the fluctuating D.C. potential toward the reference potential to null the control voltage.

2. In a system as set forth in claim 1, said signals being recorded in mutually spaced relation on said medium and the density of signals varying therealong, said converting means comprising a rectifier circuit; and filter means having a time constant longer than the interval between recorded signals and shorter than the rate at which the density of signals varies on the carrying medium.

3. In a system as set forth in claim 1, said polarity sensitive means comprising two electronic valve means connected to actuate said motor speed control means in opposite directions, and said valve means having control electrodes connected in mutually opposite senses across said control voltage whereby one valve means is energized for one control voltage polarity and the other valve means is energized for opposite control voltage polarity.

4. A programmed speed control system for controlling the speed of a motor in response to control signals recorded on a signal carrying medium advanced by said motor, comprising transducer and wave form shaping means cooperating with said medium and delivering uniform pulses initiated by the respective recorded signals; converting means connected to said shaping means and changing said pulses into a D.C. potential fluctuating in value in inverse proportion to the rate at which said uniform pulses are received; a source of D.C. reference potential; bridge means connected to receive both potentials in polarity opposition and delivering a control voltage proportional to the difference therebetween and having a polarity dependent on which potential is greater; motor speed control means; an auxiliary reversible motor regulating said motor speed control means; and electronic valve means connected between said bridge means and said reversible motor and controlling the direction and rotation of the latter in response to said control voltage from the bridge.

5. In a system as set forth in claim 4, said auxiliary reversible motor having a forward and having a reverse winding; and said electronic valve means comprising a separate electronic valve in control of each winding, whereby one valve is energized for one control voltage polarity and the other valve is energized for opposite control voltage polarity and neither valve is energized when said potentials exactly balance so that no control voltage is present.

6. In a system as set forth in claim 5, said motor comprising an induction motor wherein said forward and reverse windings are pole-shading windings, said electronic valves being connected across each respective winding, whereby when a valve is energized it short-circuits the associated winding in proportion to the amplitude of the energizing control voltage.

7. A programmed speed control system for controlling the speed of a motor in response to control signals recorded on a signal carrying medium advanced by said motor, comprising transducer and amplifier means cooperating with said medium and delivering pulses representative of the recorded signals; wave form shaping means connected with said amplifier means and delivering output waves the cycles of which correspond with the rate of recurrence of said pulses and all of said cycles having the same energy content; converting means connected to said shaping means and changing said cycles into a D.C. potential fluctuating in value in inverse proportion to the rate at which said uniform cycles are received; a source of D.C. reference potential; bridge means connected to receive both potentials in polarity opposition and delivering a control voltage proportional to the difference therebetween and having a polarity dependent on which potential is greater; motor speed control means; and polarity sensitive means connected between said bridge means and said speed control means and actuating the latter to regulate the motor speed and constantly correct the fluctuating D.C. potential toward the reference potential to null the control voltage.

8. In a system as set forth in claim 7, said signals being recorded in mutually spaced relation on said medium and the density of signals varying therealong, said converting means comprising a rectifier circuit; and filter means having a time constant longer than the interval between recorded signals and shorter than the rate at which the density of signals varies on the carrying medium.

9. In a system as set forth in claim 7, said polarity sensitive means comprising two electronic valve means connected to actuate said motor speed control means in opposite directions, and said valve means having control electrodes connected in mutually opposite sense across said control voltage whereby one valve means is energized for one control voltage polarity and the other valve means is energized for opposite control voltage polarity.

10. A programmed speed control system for controlling the speed of a motor in response to control signals recorded on a signal carrying medium advanced by said motor, comprising transducer and amplifier means cooperating with said medium and delivering pulses representative of the recorded signals; wave form shaping means connected with said amplifier means and delivering output waves the cycles of which correspond with the rate of recurrence of said pulses and all of said cycles having the same energy content; converting means connected to said shaping means and changing said cycles into a D.C. potential fluctuating in value in inverse proportion to the rate at which said uniform cycles are received; a source of D.C. reference potential; bridge means connected to receive both potentials in polarity opposition and delivering a control voltage proportional to the difference therebetween and having a polarity dependent on which potential is greater; motor speed control means; polarity-sensitive control means connected between said bridge means and said speed control means and actuating the latter to regulate the motor speed and constantly correct the fluctuating D.C. potential toward the reference potential to null the control voltage; and gain control means connected for actuation by said polarity-sensitive control means and adjusting the gain of said amplifier means inversely as the speed of the motor.

11. In a system as set forth in claim 10, said signals being recorded in mutually spaced relation on said medium and the density of signals varying therealong, said converting means comprising a rectifier circuit; and filter means having a time constant longer than the interval between recorded signals and shorter than the rate at which the density of signals varies on the carrying medium.

12. In a system as set forth in claim 10, said polarity sensitive means comprising two electronic valve means connected to actuate said motor speed control means in opposite directions, and said valve means having control electrodes connected in mutually opposite senses across said control voltage whereby one valve means is energized for one control voltage polarity and the other valve means is energized for opposite control voltage polarity.

13. A programmed speed control system for controlling the speed of a motor in response to control signals recorded on a signal carrying medium advanced by said motor, comprising transducer and amplifier means cooperating with said medium and delivering pulses representative of the recorded signals; wave form shaping means connected with said amplifier means and delivering output waves the cycles of which correspond with the rate of recurrence of said pulses and all of said cycles having the same energy content; converting means connected to said shaping means and changing said cycles into a D.C. potential fluctuating in value in inverse proportion to the rate at which said uniform cycles are received; a source of D.C. reference potential; bridge means connected to receive both potentials in polarity opposition and delivering a control voltage proportional to the difference therebetween and having a polarity dependent on which potential is greater; motor speed control means; an auxiliary reversible motor regulating said motor speed control means; and electronic valve means connected between said bridge means and said reversible motor and controlling the direction and rotation of the latter in response to said control voltage from the bridge.

14. In a system as set forth in claim 13, said auxiliary reversible motor having a forward and having a reverse winding; and said electronic valve means comprising a separate electronic valve in control of each winding, whereby one valve is energized for one control voltage polarity and the other valve is energized for opposite control voltage polarity and neither valve is energized when said potentials exactly balance so that no control voltage is present.

15. In a system as set forth in claim 14, said motor comprising an induction motor wherein said forward and reverse windings are pole-shading windings, said electronic valves being connected across each respective winding, whereby when a valve is energized it short-circuits the associated winding in proportion to the amplitude of the energizing control voltage.

16. A programmed speed control system for controlling the speed of a motor in response to control signals recorded on a signal carrying medium advanced by said motor, comprising transducer and amplifier means cooperating with said medium and delivering pulses representative of the recorded signals; wave form shaping means connected with said amplifier means and delivering output waves the cycles of which correspond with the rate of recurrence of said pulses and all of said cycles having the same energy content; converting means connected to said shaping means and changing said cycles into a D.C. potential fluctuating in value in inverse proportion to the rate at which said uniform cycles are received; a source of D.C. reference potential; bridge means connected to receive both potentials in polarity opposition and delivering a control voltage proportional arithmetic difference therebetween and having a polarity dependent on which potential is greater; motor speed control means; an auxiliary reversible motor regulating said motor speed control means; electronic valve means connected between said bridge means and said reversible motor and controlling the direction and rotation of the latter in response to said control voltage from the bridge; and gain control means connected to said reversible motor and adjusting the gain of said amplifier means inversely as the speed of the first mentioned motor.

17. In a system as set forth in claim 16, said auxiliary reversible motor having a forward and having a reverse winding; and said electronic valve means comprising a separate electronic valve in control of each winding, whereby one valve is energized for one control voltage polarity and the other valve is energized for opposite control voltage polarity and neither valve is energized when said potentials exactly balance so that no control voltage is present.

18. In a system as set forth in claim 17, said motor comprising an induction motor wherein said forward and reverse windings are pole-shading windings, said electronic valves being connected across each respective winding, whereby when a valve is energized it short-circuits the associated winding in proportion to the amplitude of the energizing control voltage.

No references cited.

UNITED STATES PATENT OFFICE
CERTIFICATE OF CORRECTION

Patent No. 2,958,026                      October 25, 1960

Robert M. Challender et al.

It is hereby certified that error appears in the above numbered patent requiring correction and that the said Letters Patent should read as corrected below.

Column 1, line 35, after "recorded" insert -- medium --; column 2, line 18, for "speeed" read -- speed --; column 5, line 54, for "raised" read -- lowered --; line 55, for "higher" read -- lower --.

Signed and sealed this 4th day of December 1962.

(SEAL)
Attest:

ERNEST W. SWIDER
Attesting Officer

DAVID L. LADD
Commissioner of Patents